April 4, 1950 — B. L. BINFORD — 2,503,089
MAGNETIC CONTROL MECHANISM
Filed Jan. 15, 1948
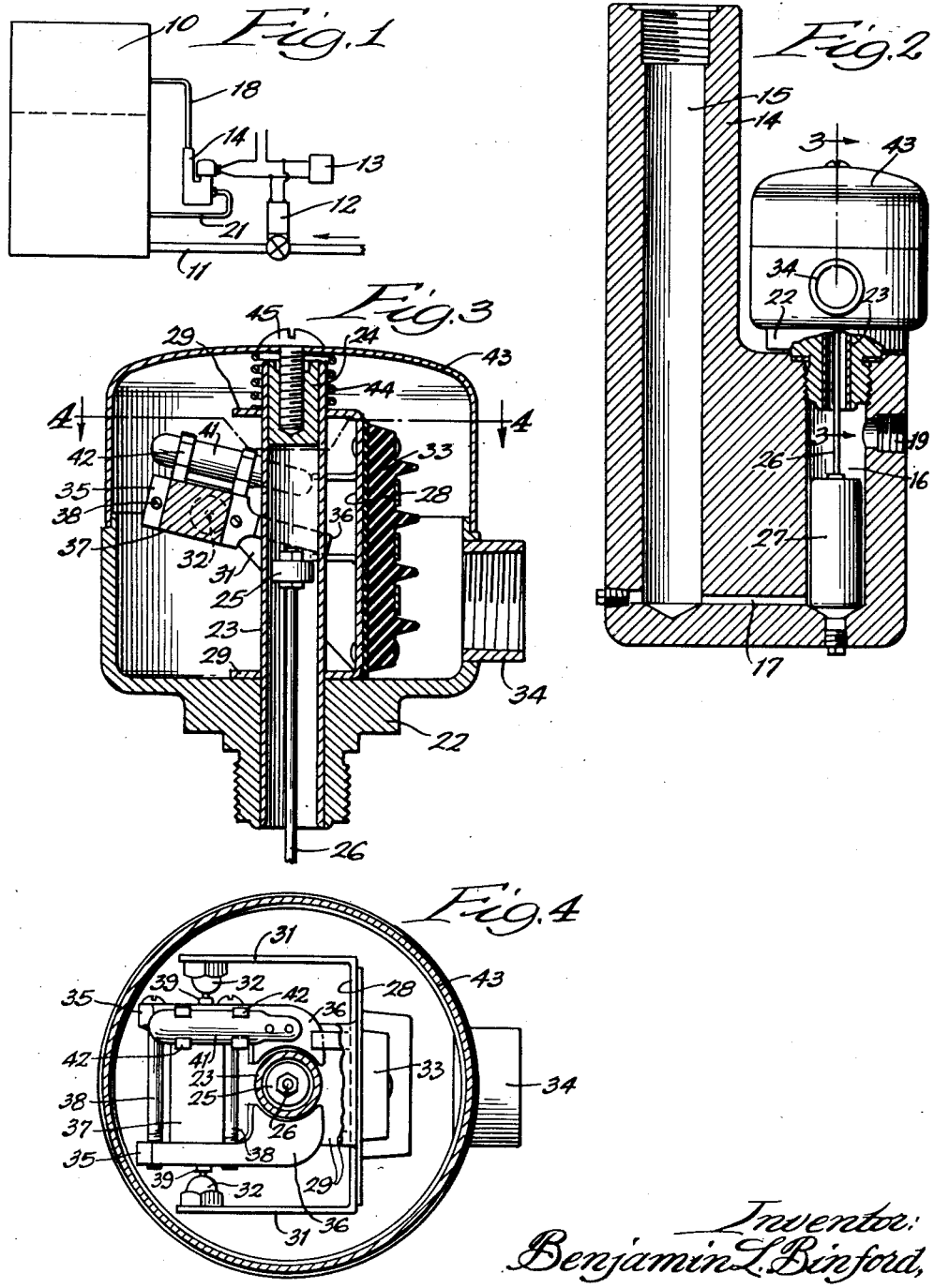
Inventor:
Benjamin L. Binford,
By Dawson, Ooms, Booth and Spangenberg,
Attorneys.

Patented Apr. 4, 1950

2,503,089

UNITED STATES PATENT OFFICE 2,503,089

MAGNETIC CONTROL MECHANISM

Benjamin L. Binford, Chicago, Ill., assignor to Magnetrol, Inc., Chicago, Ill., a corporation of Illinois Application January 15, 1948, Serial No. 2,392

7 Claims. (Cl. 200—84)

This invention relates to magnetic control mechanism and more particularly to mechanism for magnetically sensing a movement which is proportional to changes in a condition and for initiating an indicating or control operation in response to such movement.

Magnetic control mechanisms have heretofore been proposed but for the most part they have been relatively complicated and expensive to construct and assemble. Many such mechanisms have been so arranged that the magnetic force resists movement of the actuator thereby interfering with the sensitivity of the device.

It is one of the objects of the present invention to provide a magnetic control mechanism in which the parts are free to move throughout the full operating range without meeting any mechanical or magnetic resistance.

Another object is to provide a magnetic control mechanism in which the parts are simple and inexpensive to fabricate and assemble.

A further object is to provide a magnetic control mechanism which is capable of use with relatively high pressures.

The above and other objects and advantages of the invention will be more readily apparent from the following description when read in connection with the accompanying drawing in which—

Figure 1 is a diagrammatic view illustrating a typical installation of a magnetic control mechanism embodying the invention for indicating or controlling liquid level;

Figure 2 is a partial section through the control mechanism of Fig. 1;

Figure 3 is an enlarged central section of the magnetic unit of Figs. 1 and 2; and Figure 4 is a transverse view on the line 4—4 of Fig. 3 with parts in elevation.

As shown in Fig. 1, the mechanism is applied to the indication or control of the liquid level in a tank or the like which may be under relatively high pressures. As shown, the mechanism is connected to a tank 10 which may be a boiler, a process tank, or the like and which is adapted to contain a liquid normally lying at substantially the level indicated by the dotted line. Liquid may be supplied to the tank through a conduit 11 under the control of a solenoid or other electrically operated valve indicated generally at 12. The mechanism is intended to maintain the level in the tank substantially constant and to indicate a dangerously high or low level by energizing an alarm shown at 13.

The mechanism of the present invention comprises a unitary body 14 which may be a casting, a forging, or the like and which is formed with a pair of parallel vertical passages 15 and 16 connected at their bottoms by a cross bore 17. The upper end of the passage 15 is connected by a conduit 18 to a point in the tank 10 above the liquid level and the body is formed with a side tap 19 to receive a pipe 21 connecting the upper end of the passage 16 to a point in the tank below the normal liquid level. Due to the fact that the body is an integral unitary construction and may be relatively thick-walled, as shown, it can withstand extremely high pressures without danger of bursting or leakage so that it can be employed with boilers, chemical process tanks, or the like operating under high pressure. Preferably, the connections 18 and 21 and the upper parts of passages 15 and 16 are filled with the same liquid which is in the tank and the lower parts of the passages are filled with a heavier liquid such as mercury.

The body 14 is adapted to carry a magnetic control unit which, as best seen in Figures 3 and 4, comprises a base fitting 22 which may be of a relatively heavy metal construction to screw into the upper end of the passage 16. The fitting permanently carries a tube 23 which is of a nonmagnetic material such as brass or bronze and which projects upwardly from the fitting to communicate with the passage 16. At its upper end, the tube is permanently closed by a plug 24 which is brazed or welded in place. The tube slidably receives a magnetic armature 25 which is connected through a rod 26 with a float 27 in the passage 16 so that the float and the armature will move vertically in response to changes in the level in the tank.

The tube is adapted to receive a frame of nonmagnetic material which is shown as having a vertical wall portion 28 with horizontal flanges 29 at its upper and lower ends. The flanges 29 are formed with openings therein to fit slidably over the tube 23 for supporting the frame relative to the tube. The frame includes side members 31 extending across opposite sides of the tube and terminating in pivot mountings 32. The vertical wall 28 of the frame may carry a terminal block 33 having wiring connections thereon to be connected to wires or cables entering the casing through a threaded boss 34 formed on the base fitting.

The frame is adapted to carry a magnetic unit for cooperation with the armature and for controlling movements in response to rise and fall of the armature. As shown, the magnetic unit comprises a pair of soft iron bars 35 which are arranged parallel to each other and each of which includes a straight generally rectangular body portion. At one end, each of the bars is flattened and turned inwardly to form pole pieces 36 which lie on diametrically opposite sides of the tube 33 and which may be shaped to fit relatively closely around the tube, as shown in Figure 4. The bars are connected by a permanent magnet 37 lying between the straight end portions thereof and are held together by tension fastenings such as machine screws 38 extending between the body portions of the bars on opposite sides of the magnet. This construction can be very easily fabricated and assembled by soldering the bars 35 to the magnet 37 and then magnetizing the assembly so that the polarity of the pole pieces 36 will be opposite. This provides a very simple and inexpensive construction which is extremely easy to fabricate and assemble.

Each of the bars carries at its outer side a pivot 39 adapted to cooperate with the adjacent pivot bearing 32 and is so located that the magnetic unit is substantially balanced about its horizontal pivotal axis. Thus, the magnetic unit can move freely in either direction to follow vertical movement of the armature with a minimum of effort and without resisting in any way movement of the armature.

To control the valve 12 and the alarm 13, the magnetic unit carries a switch shown as a mercury switch 41 mounted in grips 42 on the magnetic unit. The mercury switch is so located with respect to the pivot that it does not disturb the balance of the magnetic unit and is connected to terminals on the terminal block 33 by flexible leads so that it is free to turn without interfering with pivotal movement of the magnetic unit.

In assembling a unit as described the magnetic unit and the switch will be assembled on the frame and connections may be made from the switch to the terminal block prior to mounting the frame on the tube. To complete the assembly, the frame may be slipped over the tube and the cables coming in through the boss 34 may be properly connected to the terminal block. The entire mechanism is preferably inclosed in a cup shaped cover 43 which may be of sheet metal or the like and which, preferably, fits against a shoulder on the base fitting to inclose the entire mechanism. To hold the frame in place, a compression spring 44 is provided acting between the cover and the upper part of the frame so that when the cover is in place, the frame will be held down against the base fitting, as shown. The cover may be held in place by a machine screw or like tension fastening 45 extending centrally through the top of the cover and threaded into the plug 24 in the top of the tube.

It will thus be seen that the control mechanism of the present invention can easily be fabricated and can easily and quickly be installed in any desired assembly. When installed, the magnetic unit will tilt easily about its pivot in response to rise and fall of the float and the armature. As the magnetic unit tilts, the switch will be opened and closed to open and close the valve 12 so that the liquid level in the tank will be maintained substantially constant and may also operate the alarm 13 to indicate the condition of the level in the tank.

While one embodiment of the invention has been shown and described in detail, it will be understood that it is illustrative only and is not intended to be a definition of the scope of the invention, reference being had for this purpose to the appended claims.

What is claimed is:

1. A magnetic control mechanism comprising a base fitting, a tube of non-magnetic material sealed in the base fitting at its lower end and closed at its upper end, a non-magnetic frame having openings therein to fit slidably over the tube, fastening means carried by the upper end of the tube and engaging the frame to hold the frame against the fitting, a U-shaped member pivoted on the frame on a horizontal axis and having magnetic poles lying adjacent the tube on diametrically opposite sides thereof, and a magnetic armature movable in the tube.

2. A magnetic control mechanism comprising a base fitting, a tube of non-magnetic materials sealed in the base fitting at its lower end and closed at its upper end, a non-magnetic frame having openings therein to fit slidably over the tube, fastening means carried by the upper end of the tube and engaging the frame to hold the frame against the fitting, a U-shaped member pivoted on the frame on a horizontal axis and having magnetic poles lying adjacent the tube on diametrically opposite sides thereof, a mercury switch mounted directly on the U-shaped member to tilt therewith, and a magnetic armature movable in the tube.

3. A magnetic control mechanism comprising a base fitting, a tube of non-magnetic material sealed in the base fitting at its lower end and closed at its upper end, a non-magnetic frame having openings therein to fit over the tube, a U-shaped member pivoted on the frame on a horizontal axis and having magnetic poles lying adjacent the tube on diametrically opposite sides thereof, a cover inclosing the tube, the frame, and the U-shaped member, a spring engaging the cover and the top of the frame to hold the frame in place on the tube, and a magnetic armature movable in the tube.

4. A magnetic control mechanism comprising a base fitting, a tube of non-magnetic material sealed in the base fitting at its lower end and closed at its upper end, a non-magnetic frame having openings therein to fit over the tube, a U-shaped member pivoted on the frame on a horizontal axis and having magnetic poles lying adjacent the tube on diametrically opposite sides thereof, a plate overlying the top of the tube, a tension fastening securing the plate to the top of the tube, and a spring between the plate and the frame to hold the frame against the base fitting.

5. A magnetic control mechanism comprising a base fitting, a tube of non-magnetic material sealed in the base fitting at its lower end and closed at its upper end, a non-magnetic frame having openings therein to fit over the tube, a U-shaped member pivoted on the frame on a horizontal axis and having magnetic poles lying adjacent the tube on diametrically opposite sides thereof, a cup-shaped cover fitting against the base fitting and extending over the top of the tube, a tension fastening connecting the cover to the top of the tube, and a spring between the cover and the frame to hold the frame against the base fitting.

6. A magnetic control mechanism comprising a body formed with a pair of vertical parallel passages communicating adjacent their lower ends, means adjacent the upper ends of the passages to connect them with different sources of pressure, a float in one of the passages, a nonmagnetic tube connected to the top of said one of the passages and projecting thereabove, a magnetic armature in the tube connected to the float to move therewith, and a magnet pivotally mounted adjacent the tube to move in response to movement of the armature.

7. A magnetic control mechanism comprising a body formed with a pair of vertical parallel passages communicating adjacent their lower ends, means adjacent the upper ends of the passages to connect them with different sources of pressure, a float in one of the passages, a base fitting detachably secured in the top of said one of the passages, a non-magnetic tube carried by the base fitting and projecting thereabove, a magnetic armature movable in the tube and connected to the float to move therewith, and a magnet pivotally carried on the base fitting adjacent the tube to move in response to movement of the armature.

BENJAMIN L. BINFORD.

REFERENCES CITED

The following references are of record in the file of this patent:

UNITED STATES PATENTS

| Number | Name | Date |
| --- | --- | --- |
| 1,734,193 | Beetz | Nov. 5, 1929 |
| 1,876,044 | Davis | Sept. 6, 1932 |